United States Patent
Wilkosz et al.

(10) Patent No.: US 11,423,891 B2
(45) Date of Patent: Aug. 23, 2022

(54) SYSTEM, DEVICE, AND METHOD FOR RESPONDING TO LOCATION-VARIABLE GROUP ELECTRONIC DIGITAL ASSISTANT INQUIRIES

(71) Applicants: MOTOROLA SOLUTIONS, INC., Chicago, IL (US); Pawel Wilkosz, Wisniowa (PL); Pawel Niemiec, Rzeszow (PL)

(72) Inventors: Pawel Wilkosz, Wisniowa (PL); Pawel Niemiec, Rzeszow (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 211 days.

(21) Appl. No.: 16/642,079

(22) PCT Filed: Dec. 13, 2017

(86) PCT No.: PCT/PL2017/050060
§ 371 (c)(1),
(2) Date: Feb. 26, 2020

(87) PCT Pub. No.: WO2019/117735
PCT Pub. Date: Jun. 20, 2019

(65) Prior Publication Data
US 2021/0366475 A1  Nov. 25, 2021

(51) Int. Cl.
*H04W 4/029* (2018.01)
*H04M 11/04* (2006.01)
(Continued)

(52) U.S. Cl.
CPC ............ *G10L 15/22* (2013.01); *H04M 11/04* (2013.01); *H04W 4/029* (2018.02); *H04W 4/06* (2013.01); *H04W 4/90* (2018.02)

(58) Field of Classification Search
None
See application file for complete search history.

(56) References Cited

U.S. PATENT DOCUMENTS

| | | | |
|---|---|---|---|
| 7,774,292 B2 | 8/2010 | Brennan et al. | |
| 2002/0077130 A1* | 6/2002 | Owensby | H04L 67/26 455/456.3 |

(Continued)

FOREIGN PATENT DOCUMENTS

| | | |
|---|---|---|
| CA | 2701303 C | 7/2014 |
| WO | 2005048067 A2 | 5/2005 |

(Continued)

OTHER PUBLICATIONS

Location-Based Services, Rescue Navigation, . downloaded from the internet Feb. 26, 2020: http://www.favendo.com/rescue-navigation, all pages.

(Continued)

*Primary Examiner* — Quynh H Nguyen

(57) ABSTRACT

A process for responding to location-variable group electronic digital assistant requests includes monitoring audio communications transmitted between a plurality of communication devices (CDs) on a group communication channel (CC) and detecting an audio inquiry from a first CD of the plurality of CDs. A location of each CD is determined, including different first and second determined locations of the first and second CDs. The audio inquiry is processed and it is determined that a response will vary based on the different first and second locations. Two different first and second responses to the audio inquiry are generated as a function of the determined locations and are caused to be provide to respective ones of the first and second CDs via one of (i) two private call CCs, (ii) one individual private call CC and the group CC, and (iii) the group CC and a second group CC.

18 Claims, 4 Drawing Sheets

(51) Int. Cl.
   *H04W 4/06*    (2009.01)
   *G10L 15/22*   (2006.01)
   *H04W 4/90*    (2018.01)

(56) References Cited

U.S. PATENT DOCUMENTS

2005/0186970 A1   8/2005   Yates et al.
2015/0095159 A1   4/2015   Kennewick et al.
2017/0083584 A1   3/2017   Blanco

FOREIGN PATENT DOCUMENTS

WO   2016191653 A1   12/2016
WO   2017043996 A1   3/2017

OTHER PUBLICATIONS

BetaPage—Group GPS Navigation, downloaded from the internet Feb. 26, 2020: https://betapage.co/product/group-gps-navigation, all pages.

Anonymous: "Grouptalk for Mobile Version 3 Setting Up the Account", Mar. 31, 2016, retrieved from the Internet: URL:https://www.grouptalk.com/cms/wp-content/uploads/2016/03/GroupTalk-for-Mobile.pdf, [retrieved on Apr. 27, 2018], all pages.

The International Search Report and the Written Opinion corresponding patent application No. PCT/PL217/050060 filed Dec. 13, 2017, dated May 8, 2018, all pages.

\* cited by examiner

SYSTEM, DEVICE, AND METHOD FOR RESPONDING TO LOCATION-VARIABLE GROUP ELECTRONIC DIGITAL ASSISTANT INQUIRIES

This application is a National Stage filing under 35 USC § 371 of co-pending Patent Cooperation Treaty international application having Serial No. PCT/PL2017/050060 (the 'PCT international application') filed on Dec. 13, 2017. This application claims priority to the PCT international application, the entire contents of which are incorporated herein by reference.

BACKGROUND OF THE INVENTION

Tablets, laptops, phones (for example, cellular or satellite), mobile (vehicular) or portable (personal) two-way radios, and other communication devices are now in common use by users, such as first responders (including firemen, police officers, and paramedics, among others), and provide such users and others with instant access to increasingly valuable additional information and resources such as vehicle histories, arrest records, outstanding warrants, health information, real-time traffic or other situational status information, and any other information that may aid the user in making a more informed determination of an action to take or how to resolve a situation, among other possibilities.

Many such communication devices further comprise, or provide access to, electronic digital assistants (or sometimes referenced as "virtual partners") that may provide the user thereof with valuable information in an automated (for example, without further user input) or semi-automated (for example, with some further user input) fashion. The valuable information provided to the user may be based on explicit requests for such information posed by the user via an input (for example, such as a parsed natural language input or an electronic touch interface manipulation associated with an explicit request) in which the electronic digital assistant may reactively provide such requested valuable information, or may be based on some other set of one or more context or triggers in which the electronic digital assistant may proactively provide such valuable information to the user absent any explicit request from the user.

As some existing examples, electronic digital assistants such as Siri provided by Apple, Inc.® and Google Now provided by Google, Inc.®, are software applications running on underlying electronic hardware that are capable of understanding natural language, and may complete electronic tasks in response to user voice inputs, among other additional or alternative types of inputs. These electronic digital assistants may perform such tasks as taking and storing voice dictation for future reference and retrieval, reading a received text message or an e-mail message aloud, generating a text message or e-mail message reply, looking up requested phone numbers and initiating a phone call to a requested contact, generating calendar appointments and providing appointment reminders, warning users of nearby dangers such as traffic accidents or environmental hazards, and providing many other types of information in a reactive or proactive manner.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
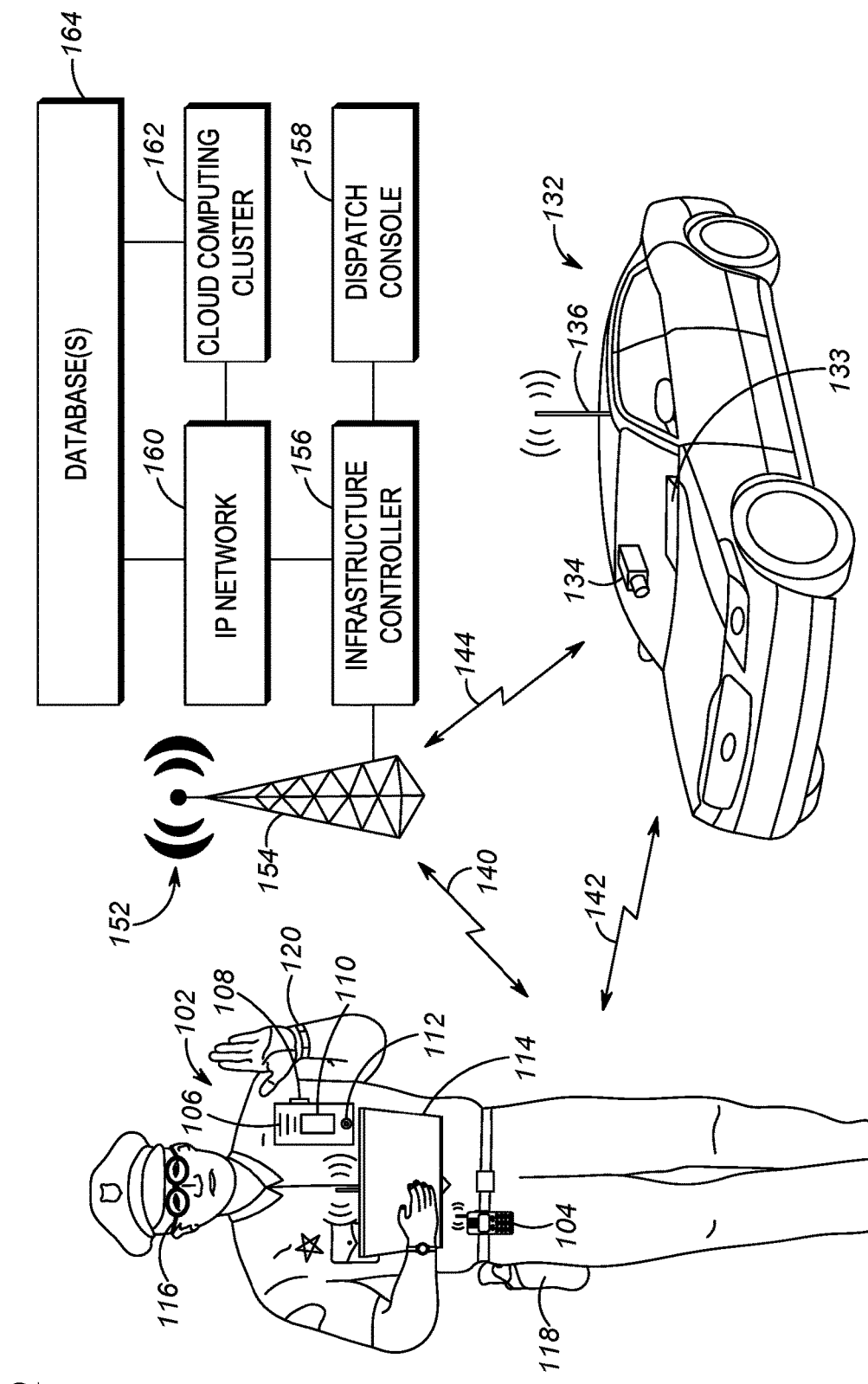
FIG. 1 is a system diagram illustrating a system for operating an electronic digital assistant, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In public safety communication systems, communication devices are often affiliated to different communication groups (also referred to as talk groups) to perform group communication. Group communication functionality allows a communication device (also referred to as a talk group member) to simultaneously communicate with multiple other devices that are associated with the same communication group. This avoids the need for communication devices to repeat the same message or establish different communication sessions to communicate the same message to other devices. In communication devices such as land mobile radios, a push to talk (PTT) interface is implemented to allow a user of the radio to press the push to talk interface to transmit audio on one or more communication channels (also referred to as a talk group channel) for reception by multiple users associated with the talk group.

In public safety environments, there may be particular members in the talk group who scattered across a wide geographic range. For example, a particular communications network supporting a particular agency or enterprise may be spread across a large urban or rural area, where some members of the communication group may be many miles away from each other. While the ability to communicate to multiple members of the group simultaneously across such a wide expanse of space is beneficial, it can create some problems when attempting to synchronize a response or provide a response to a communication group (i.e., talkgroup) of members that is accurate and comprehensible across a diverse mix of contextual differences that may include location, environment, and other differing parameters. This is especially true when an electronic digital assistant is attempting to automatically and dynamically provide useful information to a communication group of users that is spread out over such a wide expanse of differing locations and other contexts.

Electronic digital assistants may thus be implemented in such wide-area communication systems to automatically monitor audio communications exchanged between members of a talk group and provide audio or other responses to members in the group when an inquiry or other actionable information is detected in the monitored audio communications. What is needed is an improved system and method for varying a response to a group-based electronic digital assistant inquiry where the members of the group may determined to be located at differing locations and thus having differing contexts relative to an electronic digital assistant response to the inquiry.

In accordance with one embodiment, a process for responding to location-variable group electronic digital assistant requests includes: monitoring, at an electronic computing device, audio communications transmitted between a plurality of communication devices on a group communication channel, wherein the plurality of communication devices are members of a communication group associated with the group communication channel; detecting, at the electronic computing device, from the audio communications, an audio inquiry from a first communication device of the plurality of communication devices; determining, by the electronic computing device, a location of each communication device in the communication group including first and second determined locations of the first communication device and a second communication device of the communication group, the first and second determined locations being different from one another; processing, at the electronic computing device, the audio inquiry and determining, by the electronic computing device, that the response will vary for at least the first and the second communication device of the communication group based on the first and second determined locations; generating, by the electronic computing device, at least two different first and second responses to the audio inquiry for the first and second communication devices as a function of first and second determined locations of each of the first and second communication devices of the communication group; and causing, by the electronic computing device, the generated at least two different first and second responses to the audio inquiry to be provided to respective ones of the first and second communication devices individually via one of (i) two private call communication channels, (ii) one individual private call communication channel and the group communication channel, and (iii) the group communication channel and a second group communication channel.

In accordance with another embodiment, an electronic computing device for responding to location-variable group electronic digital assistant requests includes: an electronic processor; and a communication interface communicatively coupled to the electronic processor, wherein the electronic processor is configured to: monitor audio communications transmitted between a plurality of communication devices on a group communication channel, wherein the plurality of communication devices are members of a communication group associated with the group communication channel; detect, from the audio communications, an audio inquiry from a first communication device of the plurality of communication devices; determine a location of each communication device in the communication group including first and second determined locations of the first communication device and a second communication device of the communication group, the first and second determined locations being different from one another; process the audio inquiry and determine that the response will vary for at least the first and the second communication device of the communication group based on the first and second determined locations; generate at least two different first and second responses to the audio inquiry for the first and second communication devices as a function of first and second determined locations of each of the first and second communication devices of the communication group; and cause the generated at least two different first and second responses to the audio inquiry to be provided to respective ones of the first and second communication devices individually via one of (i) two private call communication channels, (ii) one individual private call communication channel and the group communication channel, and (iii) the group communication channel and a second group communication channel.

Each of the above-mentioned embodiments will be discussed in more detail below, starting with example communication system and device architectures of the system in which the embodiments may be practiced, followed by an illustration of processing steps for achieving the method, device, and system for an electronic digital assistant. Further advantages and features consistent with this disclosure will be set forth in the following detailed description, with reference to the figures.

1. Communication System and Device Structures a. Communication System Structure

Figure 2:
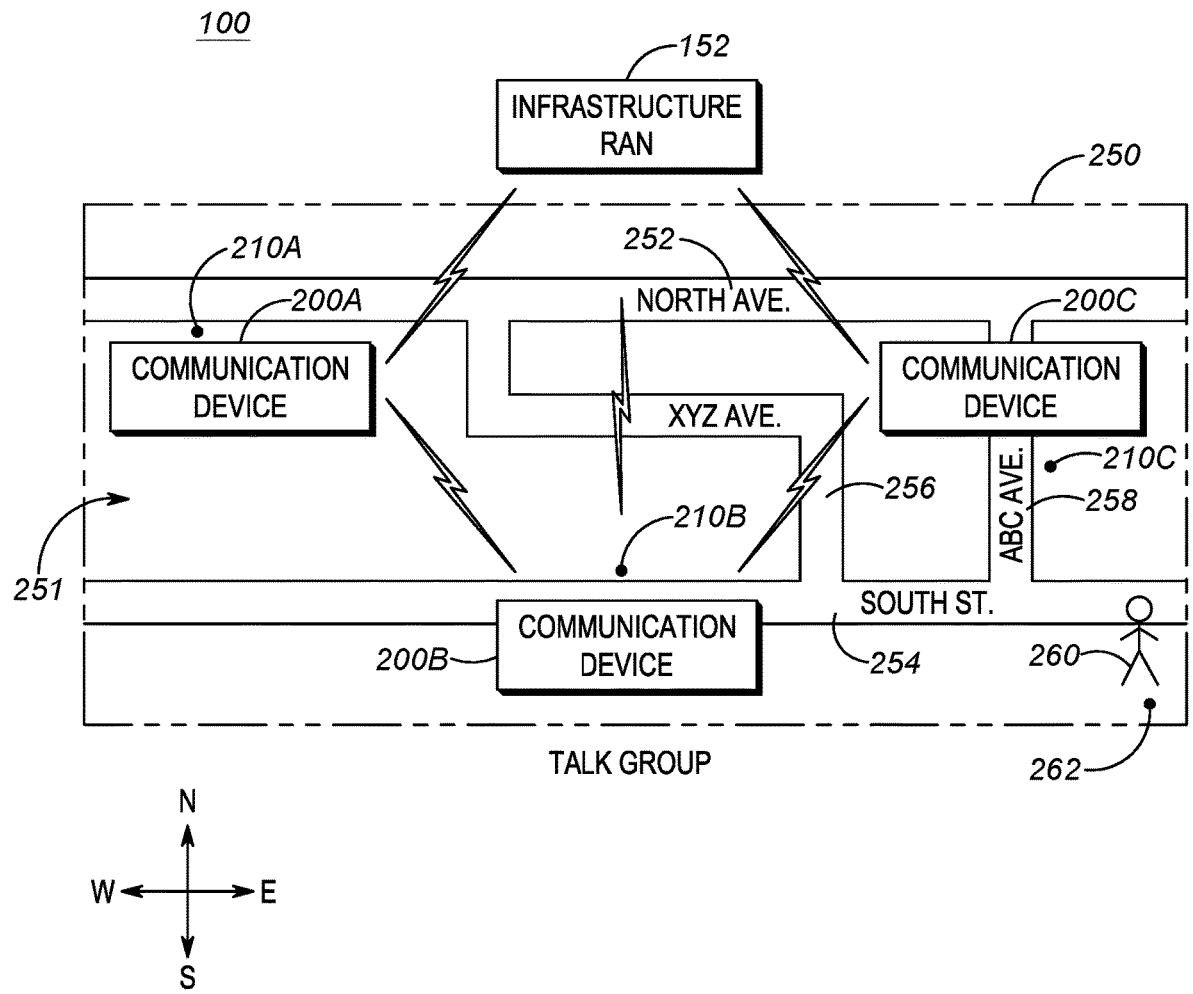
FIG. 2 is a system diagram illustrating a plurality of communication devices of FIG. 1 that are associated with a talk group and which may be located at varying locations, in accordance with some embodiments.

Referring now to the drawings, and in particular FIGS. 1 and 2, a communication system 100 is shown including a first set of devices that a user 102 (illustrated in FIG. 1 as a first responder police officer) may wear, such as a primary battery-powered portable radio 104 used for narrowband and/or broadband direct-mode or infrastructure communications, a battery-powered radio speaker microphone (RSM) video capture device 106, a laptop 114 having an integrated video camera and used for data applications such as incident support applications, smart glasses 116 (for example, which may be virtual reality, augmented reality, or mixed reality glasses), sensor-enabled holster 118, and/or biometric sensor wristband 120. Although FIG. 1 illustrates only a single user 102 with a respective first set of devices, in other embodiments, the single user 102 may include additional sets of same or similar devices, and additional users may be present with respective additional sets of same or similar devices as indicated by FIG. 2.

System 100 may also include a vehicle 132 associated with the user 102 having an integrated mobile communication device 133, an associated vehicular video camera 134, and a coupled vehicular transceiver 136. Although FIG. 1 illustrates only a single vehicle 132 with a single mobile communication device 133, respective single vehicular video camera 134 and/or microphone, and a single coupled vehicular transceiver 136, in other embodiments, the vehicle 132 may include additional same or similar mobile communication devices, video cameras, microphones, and/or transceivers, and additional vehicles may be present with respective additional sets of mobile communication devices, video cameras, microphones, and/or transceivers.

Each of the portable radio 104, RSM video capture device 106, laptop 114, and vehicular mobile communication device 133 may be capable of directly wirelessly communicating via direct-mode wireless link(s) 142, and/or may be capable of wirelessly communicating via a wireless infrastructure radio access network (RAN) 152 over respective wireless link(s) 140, 144 and via corresponding transceiver circuits. These devices are configured to receive inputs associated with the user 102 and/or provide outputs to the user 102 in addition to communicating information to and from other communication devices and the infrastructure RAN 152.

Many of the devices shown in FIG. 1 (such as the portable radio 104, the RSM video capture device 106, the laptop 114, the mobile communication device 133, the infrastructure controller 156, dispatch console 158, and one or more computing devices in the cloud computing cluster 162) may be referred to as communication devices (for example, communication devices 200A, 200B, 200C shown in FIG. 2). Although FIG. 1 shows multiple communication devices associated with the user 102, in some embodiments, the communication system 100 includes communication devices of multiple users.

For example, as shown in FIG. 2, multiple communication devices 200A-200C may form a talk group 250 and may be dispersed across a wide geographic area 251. The communication device 200A may be associated with a first user located at a first location 210A, the communication device 200B may be associated with a second user located at a second location 210B, and the communication device 200C may be associated with a third user located at a third location 210C. More specifically, and as illustrated in FIG. 2, communication device 200A may be located at a geographic location 210A on North Ave., communication device 200B may be located at geographic location 210B on South St., and communication device 200C may be located at geographic location 210C on ABC Ave. Locations 210A, 210B, and 210C may be defined by street or business addresses, longitude/latitude coordinates determined via a global navigation satellite system (GNSS) system such as the Global Positioning System (GPS), Cartesian or polar coordinates determined via a communication device performed triangulation process via known locations of base stations or other wireless transmitters, or by a network-determined location identified via a similar triangulation process across a plurality of known base station or other wireless access point locations.

Further, as shown in FIG. 2, the communication devices 200A, 200B, and 200C are members of the same talk group i.e. talk group 250. Although not shown in FIG. 2, each of the communication devices 200A, 200B, 200C may also be associated with one or more talk groups other than the talk group 250.

In some embodiments, the communication devices 200A-200C communicate with each other over the infrastructure RAN 152 and/or communicate with each other directly as described herein. Similarly, other devices, such as the dispatch console 158, may communicate with communication devices 200A-200C of multiple users through the infrastructure RAN 152. In some embodiments, one or more users may have multiple associated communication devices, for example, as shown in FIG. 1. As shown in FIG. 2, the communication devices 200A, 200B, 200C may be dispersed across a wide geographic area 251 supported by infrastructure RAN 152 and positioned at various locations that may vary over time within the wide geographic area 251.

Although FIG. 2 illustrates communication device 200A, 200B, and 200C located at various outdoor geographic locations, in other embodiments, indoor locationing may be used to identify relative locations within a building, including by room, floor, indoor coordinate, cardinal location, of some other combination of indoor locationing parameters.

Referring back to FIG. 1, the portable radio 104, in particular, may be any communication device 200 used for infrastructure RAN or direct-mode media (for example, voice, audio, video, etc.) communication via a long-range wireless transmitter and/or transceiver that has a transmitter transmit range on the order of miles, for example, 0.5-50 miles, or 3-20 miles (for example, in comparison to a short-range transmitter such as a Bluetooth, Zigbee, or NFC transmitter) with other communication devices and/or the infrastructure RAN 152. The long-range transmitter may implement a direct-mode, conventional, or trunked land mobile radio (LMR) standard or protocol such as European Telecommunications Standards Institute (ETSI) Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, the long range transmitter may implement a Long Term Evolution (LTE), LTE-Advance, or 5G protocol including multimedia broadcast multicast services (MBMS) or single site point-to-multipoint (SC-PTM) over which an open mobile alliance (OMA) push to talk (PTT) over cellular (OMA-PoC), a voice over IP (VoIP), an LTE Direct or LTE Device to Device, or a PTT over IP (PoW) application may be implemented. In still further embodiments, the long range transmitter may implement a Wi-Fi protocol perhaps in accordance with an IEEE 802.11 standard (for example, 802.11a, 802.11b, 802.11g) or a WiMAX protocol perhaps operating in accordance with an IEEE 802.16 standard.

In the example of FIG. 1, the portable radio 104 may form the hub of communication connectivity for the user 102, through which other accessory devices, such as a biometric sensor (for example, the biometric sensor wristband 120), an activity tracker, a weapon status sensor (for example, the sensor-enabled holster 118), a heads-up-display (for example, the smart glasses 116), the RSM video capture device 106, and/or the laptop 114 may communicatively couple.

In order to communicate with and exchange video, audio, and other media and communications with the RSM video capture device 106, laptop 114, and/or smart glasses 116, the portable radio 104 may contain one or more physical electronic ports (such as a universal serial bus (USB) port, an Ethernet port, an audio jack, etc.) for direct electronic coupling with the RSM video capture device 106, laptop 114, and/or smart glasses 116. In some embodiments, the portable radio 104 may contain a short-range transmitter (for example, in comparison to the long-range transmitter such as a LMR or Broadband transmitter) and/or transceiver for wirelessly coupling with the RSM video capture device 106, laptop 114, and/or smart glasses 116. The short-range transmitter may be a Bluetooth, Zigbee, or near field communication (NFC) transmitter having a transmit range on the order of 0.01-100 meters, or 0.1-10 meters. In other embodiments, the RSM video capture device 106, the laptop 114, and/or the smart glasses 116 may contain their own long-range transceivers and may communicate with one another and/or with the infrastructure RAN 152 or vehicular transceiver 136 directly without passing through portable radio 104.

The RSM video capture device 106 provides voice functionality features similar to a traditional RSM, including one or more of acting as a remote microphone that is closer to the user's 102 mouth, providing a remote speaker allowing playback of audio closer to the user's 102 ear, and including a PTT switch/interface or other type of PTT input. The voice and/or audio recorded at the remote microphone may be provided to the portable radio 104 for storage and/or analysis or for further transmission to other mobile communication devices or the infrastructure RAN 152, or may be directly transmitted by the RSM video capture device 106 to other communication devices or to the infrastructure RAN 152. The voice and/or audio played back at the remote speaker may be received from the portable radio 104 or received directly from one or more other communication devices or the infrastructure RAN 152. The RSM video capture device 106 may include a separate physical PTT switch 108 that functions, in cooperation with the portable radio 104 or on its own, to maintain the portable radio 104 and/or RSM video capture device 106 in a monitor only mode, and which switches the device(s) to a transmit-only mode (for half-duplex devices) or transmit and receive mode (for full-duplex devices) upon depression or activation of the PTT switch 108. The portable radio 104 and/or RSM video capture device 106 may form part of a group communications architecture (such as a talk group 250 shown in FIG. 2) that allows a single communication device to communicate with one or more group members (not shown) associated with a particular group of devices at a same time.

Additional features may be provided at the RSM video capture device 106 as well. For example, a display screen 110 may be provided for displaying images, video, and/or text to the user 102 or to someone else. The display screen 110 may be, for example, a liquid crystal display (LCD) screen or an organic light emitting display (OLED) display screen. In some embodiments, a touch sensitive input interface may be incorporated into the display screen 110 as well, allowing the user 102 to interact with content provided on the display screen 110. A soft PTT input may also be provided, for example, via such a touch interface.

A video camera 112 may also be provided at the RSM video capture device 106, integrating an ability to capture images and/or video and store the captured image data (for further analysis) or transmit the captured image data as an image or video stream to the portable radio 104 and/or to other communication devices or to the infrastructure RAN 152 directly. The video camera 112 and RSM remote microphone may be used, for example, for capturing audio and/or video of a field-of-view associated with the user 102, perhaps including a suspect and the suspect's surroundings, storing the captured image and/or audio data for further analysis or transmitting the captured audio and/or video data as an audio and/or video stream to the portable radio 104 and/or to other communication devices or to the infrastructure RAN 152 directly for further analysis. An RSM remote microphone of the RSM video capture device 106 may be an omni-directional or unidirectional microphone or array of omni-directional or unidirectional microphones that may be capable of identifying a direction from which a captured sound emanated.

In some embodiments, the RSM video capture device 106 may be replaced with a more limited body worn camera that may include the video camera 112 and/or microphone noted above for capturing audio and/or video, but may forego one or more of the features noted above that transform the body worn camera into a more full featured RSM, such as the separate physical PTT switch 108 and the display screen 110, and remote microphone functionality for voice communications in cooperation with portable radio 104.

The laptop 114, in particular, may be any wireless communication device used for infrastructure RAN or direct-mode media communication via a long-range or short-range wireless transmitter with other communication devices and/or the infrastructure RAN 152. The laptop 114 includes a display screen for displaying a user interface to an operating system and one or more applications running on the operating system, such as a broadband PTT communications application, a web browser application, a vehicle history database application, a workflow application, a forms or reporting tool application, an arrest record database application, an outstanding warrant database application, a mapping and/or navigation application, a health information database application, and/or other types of applications that may require user interaction to operate. The laptop 114 display screen may be, for example, an LCD screen or an OLED display screen. In some embodiments, a touch sensitive input interface may be incorporated into the display screen as well, allowing the user 102 to interact with content provided on the display screen. A soft PTT input may also be provided, for example, via such a touch interface.

Front and/or rear-facing video cameras may also be provided at the laptop 114, integrating an ability to capture video and/or audio of the user 102 and the user's 102 surroundings, perhaps including a field-of-view of the user 102 and/or a suspect (or potential suspect) and the suspect's surroundings, and store and/or otherwise process the captured video and/or audio for further analysis or transmit the captured video and/or audio as a video and/or audio stream to the portable radio 104, other communication devices, and/or the infrastructure RAN 152 for further analysis.

The smart glasses 116 may include a digital imaging device, an electronic processor, a short-range and/or long-range transceiver device, and/or a projecting device. The smart glasses 116 may maintain a bi-directional connection with the portable radio 104 and provide an always-on or on-demand video feed pointed in a direction of the user's 102 gaze via the digital imaging device, and/or may provide a personal display via the projection device integrated into the smart glasses 116 for displaying information such as text, images, or video received from the portable radio 104 or directly from the infrastructure RAN 152. In some embodiments, the smart glasses 116 may include its own long-range transceiver and may communicate with other communication devices and/or with the infrastructure RAN 152 or vehicular transceiver 136 directly without passing through portable radio 104. In some embodiments, an additional user interface mechanism such as a touch interface or gesture detection mechanism may be provided at the smart glasses 116 that allows the user 102 to interact with the display elements displayed on the smart glasses 116 or projected into the user's 102 eyes, or to modify operation of the digital imaging device. In other embodiments, a display and input interface at the portable radio 104 may be provided for interacting with smart glasses 116 content and modifying operation of the digital imaging device, among other possibilities.

The smart glasses 116 may provide a virtual reality interface in which a computer-simulated reality electronically replicates an environment with which the user 102 may interact. In some embodiments, the smart glasses 116 may provide an augmented reality interface in which a direct or indirect view of real-world environments in which the user is currently disposed are augmented (that is, supplemented, by additional computer-generated sensory input such as sound, video, images, graphics, GPS data, or other information). In still other embodiments, the smart glasses 116 may provide a mixed reality interface in which electronically generated objects are inserted in a direct or indirect view of real-world environments in a manner such that they may co-exist and interact in real time with the real-world environment and real world objects.

The sensor-enabled holster 118 may be an active (powered) or passive (non-powered) sensor that maintains and/or provides state information regarding a weapon or other item normally disposed within the user's 102 sensor-enabled holster 118. The sensor-enabled holster 118 may detect a change in state (presence to absence) and/or an action (removal) relative to the weapon normally disposed within the sensor-enabled holster 118. The detected change in state and/or action may be reported to the portable radio 104 via its short-range transceiver. In some embodiments, the sensor-enabled holster 118 may also detect whether the first responder's hand is resting on the weapon even if it has not yet been removed from the holster and provide such information to portable radio 104. In some embodiments, a weapon of the user 102 may include a sensor that detects when the weapon is discharged. The detected discharge may be reported to the portable radio 104, for example. Other possibilities exist as well.

The biometric sensor wristband 120 may be an electronic device for tracking an activity of the user 102 or a health status of the user 102, and may include one or more movement sensors (such as an accelerometer, magnetometer, and/or gyroscope) that may periodically or intermittently provide to the portable radio 104 indications of orientation, direction, steps, acceleration, and/or speed, and indications of health such as one or more of a captured heart rate, a captured breathing rate, and a captured body temperature of the user 102, perhaps accompanying other information. In some embodiments, the biometric sensor wristband 120 may include its own long-range transceiver and may communicate with other communication devices and/or with the infrastructure RAN 152 or vehicular transceiver 136 directly without passing through portable radio 104.

An accelerometer is a device that measures acceleration. Single and multi-axis models are available to detect magnitude and direction of the acceleration as a vector quantity, and may be used to sense orientation, acceleration, vibration shock, and falling. A gyroscope is a device for measuring or maintaining orientation, based on the principles of conservation of angular momentum. One type of gyroscope, a microelectromechanical system (MEMS) based gyroscope, uses lithographically constructed versions of one or more of a tuning fork, a vibrating wheel, or resonant solid to measure orientation. Other types of gyroscopes could be used as well. A magnetometer is a device used to measure the strength and/or direction of the magnetic field in the vicinity of the device, and may be used to determine a direction in which a person or device is facing.

The heart rate sensor may use electrical contacts with the skin to monitor an electrocardiography (EKG) signal of its wearer, or may use infrared light and imaging device to optically detect a pulse rate of its wearer, among other possibilities.

A breathing rate sensor may be integrated within the sensor wristband 120 itself, or disposed separately and communicate with the sensor wristband 120 via a short range wireless or wired connection. The breathing rate sensor may include use of differential capacitive circuits or capacitive transducers to measure chest displacement and thus breathing rates. In other embodiments, a breathing sensor may monitor a periodicity of mouth and/or nose-exhaled air (for example, using a humidity sensor, temperature sensor, capnometer or spirometer) to detect a respiration rate. Other possibilities exist as well.

A body temperature sensor may include an electronic digital or analog sensor that measures a skin temperature using, for example, a negative temperature coefficient (NTC) thermistor or a resistive temperature detector (RTD), may include an infrared thermal scanner module, and/or may include an ingestible temperature sensor that transmits an internally measured body temperature via a short range wireless connection, among other possibilities.

Although the biometric sensor wristband 120 is shown in FIG. 1 as a bracelet worn around the wrist, in other examples, the biometric sensor wristband 120 may additionally and/or alternatively be worn around another part of the body, or may take a different physical form including an earring, a finger ring, a necklace, a glove, a belt, or some other type of wearable, ingestible, or insertable form factor. In some embodiments, the biometric sensor wristband 120 or another device of the user 102 may detect characteristics of the environment of the user 102 (for example, temperature, humidity, air quality, and the like).

The portable radio 104, RSM video capture device 106, laptop 114, smart glasses 116, sensor-enabled holster 118, and/or biometric sensor wristband 120 may form a personal area network (PAN) via corresponding short-range PAN transceivers, which may be based on a Bluetooth, Zigbee, Bluetooth Low Energy, WiFi, Near Field Communication (NFC), Radio Frequency ID (RFID) or other short-range wireless protocol having a transmission range on the order of meters, tens of meters, or hundreds of meters.

The portable radio 104 and/or RSM video capture device 106 (or any other device in FIG. 1, for that matter) may each include a location determination device integrated with or separately disposed in the portable radio 104 and/or RSM 106 and/or in respective receivers, transmitters, or transceivers of the portable radio 104 and RSM 106 for determining a location of the portable radio 104 and RSM 106. The location determination device may be, for example, a global positioning system (GPS) receiver or wireless triangulation logic using a wireless receiver or transceiver and a plurality of wireless signals received at the wireless receiver or transceiver from different locations, among other possibilities. The location determination device may also include an orientation sensor for determining an orientation that the device is facing. Each orientation sensor may include a gyroscope and/or a magnetometer. Other types of orientation sensors could be used as well. The location may then be stored locally or transmitted via the transmitter or transceiver to other communication devices and/or to the infrastructure RAN 152.

The vehicle 132 associated with the user 102 may include the mobile communication device 133, the vehicular video camera 134 and/or microphone, and the vehicular transceiver 136, all of which may be coupled to one another via a wired and/or wireless vehicle area network (VAN), perhaps along with other sensors physically or communicatively coupled to the vehicle 132. The vehicular transceiver 136 may include a long-range transceiver for directly wirelessly communicating with communication devices such as the portable radio 104, the RSM 106, and the laptop 114 via wireless link(s) 142 and/or for wirelessly communicating with the RAN 152 via wireless link(s) 144. The vehicular transceiver 136 may further include a short-range wireless transceiver or wired transceiver for communicatively coupling between the mobile communication device 133 and/or the vehicular video camera 134 in the VAN. The mobile communication device 133 may, in some embodiments, include the vehicular transceiver 136 and/or the vehicular video camera 134 integrated therewith, and may operate to store and/or process video and/or audio produced by the video camera 134 and/or transmit the captured video and/or audio as a video and/or audio stream to the portable radio 104, other communication devices, and/or the infrastructure RAN 152 for further analysis. A microphone (not shown), or an array thereof, may be integrated in the video camera 134 and/or at the mobile communication device 133 (or additionally or alternatively made available at a separate location of the vehicle 132) and communicatively coupled to the mobile communication device 133 and/or vehicular transceiver 136 for capturing audio and storing, processing, and/or transmitting the audio in a same or similar manner to the video as set forth above. The omni-directional or uni-directional microphone, or an array thereof, may be integrated in the video camera 134 and/or at the mobile communication device 133 (or additionally or alternatively made available at a separate location of the vehicle 132) and communicably coupled to the mobile communication device 133 and/or vehicular transceiver 136 for capturing audio and storing, processing, and/or transmitting the audio in a same or similar manner as set forth above with respect to the RSM 106.

The vehicle 132 may be a human-operable vehicle, or may be a self-driving vehicle operable under control of the mobile communication device 133 perhaps in cooperation with video camera 134 (which may include a visible-light camera, an infrared camera, a time-of-flight depth camera, and/or a light detection and ranging (LiDAR) device). Command information and/or status information such as location and speed may be exchanged with the self-driving vehicle via the VAN and/or the PAN (when the PAN is in range of the VAN or via the VAN's infrastructure RAN link). In some embodiments, devices within the vehicle 132 may communicate with devices in other vehicles via a Vehicular to Vehicular (V2V) Network.

The vehicle 132 and/or transceiver 136, similar to the portable radio 104 and/or respective receivers, transmitters, or transceivers thereof, may include a location (and/or orientation) determination device integrated with or separately disposed in the mobile communication device 133 and/or transceiver 136 for determining (and storing and/or transmitting) a location (and/or orientation) of the vehicle 132.

In some embodiments, instead of a vehicle 132, a land, air, or water-based drone with the same or similar audio and/or video and communications capabilities and the same or similar self-navigating capabilities as set forth above may be disposed, and may similarly communicate with the user's 102 PAN and/or with the infrastructure RAN 152 to support the user 102 in the field.

The VAN may communicatively couple with the PAN disclosed above when the VAN and the PAN come within wireless transmission range of one another, perhaps after an authentication takes place there between. In some embodiments, one of the VAN and the PAN may provide infrastructure communications to the other, depending on the situation and the types of devices in the VAN and/or PAN and may provide interoperability and communication links between devices (such as video cameras) and sensors within the VAN and PAN.

Although the RSM 106, the laptop 114, and the vehicle 132 are illustrated in FIG. 1 as providing example video cameras and/or microphones for use in capturing audio and/or video streams, other types of cameras and/or microphones could be used as well, including but not limited to, fixed or pivotable video cameras secured to lamp posts, automated teller machine (ATM) video cameras, other types of body worn cameras such as head-mounted cameras, other types of vehicular cameras such as roof-mounted cameras, or other types of audio and/or video recording devices accessible via a wired or wireless network interface same or similar to that disclosed herein.

In some embodiments, one or more of the user 102, the vehicle 132, the portable radio 104, the RSM video capture device 106, and any other device in FIG. 1 may be equipped with an environmental sensor such as a chemical, biological, radiological, nuclear, or explosive (CBRNE) sensor. Measurements made by the CBRNE sensor may be stored locally or transmitted via a transmitter or transceiver to other communication devices and/or to the infrastructure RAN 152.

Infrastructure RAN 152 is a radio access network that provides for radio communication links to be arranged within the network between a plurality of communication devices. Such communication devices may be portable, mobile, or stationary and may include any one or more of the communication devices illustrated in FIG. 1, among other possibilities. At least one other terminal, for example used in conjunction with the communication devices, may be a fixed terminal, for example a base station, eNodeB, repeater, and/or access point. Such a RAN typically includes a system infrastructure that generally includes a network of various fixed terminals, which are in direct radio communication with the communication devices. Each of the fixed terminals operating in the RAN 152 may have one or more transceivers which may, for example, serve communication devices in a given region or area, known as a 'cell' or 'site', by radio frequency (RF) communication. The communication devices that are in direct communication with a particular fixed terminal are said to be served by the fixed terminal. In one example, all radio communications to and from each communication device within the RAN 152 are made via respective serving fixed terminals. Sites of neighboring fixed terminals may be offset from one another and may provide corresponding non-overlapping or partially or fully overlapping RF coverage areas.

Infrastructure RAN 152 may operate according to an industry standard wireless access technology such as, for example, an LTE, LTE-Advance, or 5G technology over which an OMA-PoC, a VoIP, an LTE Direct or LTE Device to Device, or a PoIP application may be implemented. Additionally or alternatively, infrastructure RAN 152 may implement a wireless local area network (WLAN) technology such as Wi-Fi perhaps operating in accordance with an IEEE 802.11 standard (for example, 802.11a, 802.11b, 802.11g) or such as a WiMAX perhaps operating in accordance with an IEEE 802.16 standard.

Infrastructure RAN 152 may additionally or alternatively operate according to an industry standard LMR wireless access technology such as, for example, the P25 standard defined by the APCO, the TETRA standard defined by the ETSI, the dPMR standard also defined by the ETSI, or the DMR standard also defined by the ETSI. Because these systems generally provide lower throughput than the broadband systems, they are sometimes designated narrowband RANs.

Communications in accordance with any one or more of these protocols or standards, or other protocols or standards, may take place over physical channels in accordance with one or more of a TDMA (time division multiple access), FDMA (frequency divisional multiple access), OFDMA (orthogonal frequency division multiplexing access), or CDMA (code division multiple access) technique.

OMA-PoC, in particular and as one example of an infrastructure broadband wireless application, enables familiar PTT and "instant on" features of traditional half duplex communication devices, but uses communication devices operating over modern broadband telecommunications networks. Using PoC, wireless communication devices such as mobile telephones and notebook computers can function as PTT half-duplex communication devices for transmitting and receiving. Other types of PTT models and multimedia call models (MMCMs) are also available.

Floor control in an OMA-PoC session is generally maintained by a PTT server (also referred to as a talk group server) that controls communications between two or more wireless communication devices. When a user of one of the communication devices keys a PTT button, a request for permission to speak in the OMA-PoC session is transmitted from the user's communication device to the PTT server using, for example, a real-time transport protocol (RTP) message. If no other users are currently speaking in the PoC session, an acceptance message is transmitted back to the user's communication device and the user may then speak into a microphone of the communication device. Using standard compression/decompression (codec) techniques, the user's voice is digitized and transmitted using discrete auditory data packets (for example, together which form an auditory data stream over time), such as according to RTP and internet protocols (IP), to the PTT server. The PTT server then transmits the auditory data packets to other users of the PoC session (for example, to other communication devices in the group of communication devices or talkgroup to which the user is subscribed), using for example, one or more of a unicast, point to multipoint, or broadcast communication technique.

Infrastructure narrowband LMR wireless systems, on the other hand, operate in either a conventional or trunked configuration. In either configuration, a plurality of communication devices is partitioned into separate groups of communication devices. In a conventional narrowband system, each communication device in a group is selected to a particular radio channel (frequency or frequency & time slot) for communications associated with that communication device's group. Thus, each group is served by one channel, and multiple groups may share the same single frequency (in which case, in some embodiments, group IDs may be present in the group data to distinguish between groups using the same shared frequency).

In contrast, a trunked radio system and its communication devices use a pool of traffic channels for virtually an unlimited number of groups of communication devices (for example, talkgroups). Thus, all groups are served by all channels. The trunked radio system works to take advantage of the probability that not all groups need a traffic channel for communication at the same time. When a member of a group requests a call on a control or rest channel on which all of the communication devices at a site idle awaiting new call notifications, in one embodiment, a call controller assigns a separate traffic channel for the requested group call, and all group members move from the assigned control or rest channel to the assigned traffic channel for the group call. In another embodiment, when a member of a group requests a call on a control or rest channel, the call controller may convert the control or rest channel on which the communication devices were idling to a traffic channel for the call, and instruct all communication devices that are not participating in the new call to move to a newly assigned control or rest channel selected from the pool of available channels. With a given number of channels, a much greater number of groups may be accommodated in a trunked radio system as compared with a conventional radio system.

Group calls may be made between wireless and/or wireline participants in accordance with either a narrowband or a broadband protocol or standard. Group members for group calls may be statically or dynamically defined. That is, in a first example, a user or administrator working on behalf of the user may indicate to the switching and/or radio network (perhaps at a call controller, PTT server, zone controller, mobile management entity (MME), base station controller (BSC), mobile switching center (MSC), site controller, Push-to-Talk controller, or other network device) a list of participants of a group at the time of the call or in advance of the call. The group members (for example, communication devices) could be provisioned in the network by the user or an agent, and then provided some form of group identity or identifier, for example. Then, at a future time, an originating user in a group may cause some signaling to be transmitted indicating that he or she wishes to establish a communication session (for example, group call) with each of the pre-designated participants in the defined group. In another example, communication devices may dynamically affiliate with a group (and also disassociate with the group) perhaps based on user input, and the switching and/or radio network may track group membership and route new group calls according to the current group membership.

In some instances, broadband and narrowband systems may be interfaced via a middleware system that translates between a narrowband PTT standard protocol (such as P25) and a broadband PTT standard protocol or application (such as OMA-PoC). Such intermediate middleware may include a middleware server for performing the translations and may be disposed in the cloud, disposed in a dedicated on-premises location for a client wishing to use both technologies, or disposed at a public carrier supporting one or both technologies. For example, and with respect to FIG. 1, such a middleware server may be disposed in infrastructure RAN 152 at infrastructure controller 156 or at a separate cloud computing cluster 162 communicably coupled to infrastructure controller 156 via internet protocol (IP) network 160, among other possibilities.

The infrastructure RAN 152 is illustrated in FIG. 1 as providing coverage for the portable radio 104, RSM video capture device 106, laptop 114, smart glasses 116, and/or vehicle transceiver 136 via a single fixed terminal 154 coupled to a single infrastructure controller 156 (for example, a radio controller, call controller, PTT server, zone controller, MME, BSC, MSC, site controller, Push-to-Talk controller, or other network device) and including the dispatch console 158 operated by a dispatcher. In other embodiments, additional fixed terminals and additional controllers may be disposed to support a larger geographic footprint and/or a larger number of mobile devices.

The infrastructure controller 156 illustrated in FIG. 1, or some other back-end infrastructure device or combination of back-end infrastructure devices existing on-premises or in the remote cloud computing cluster 162 accessible via the IP network 160 (such as the Internet), may additionally or alternatively operate as a back-end electronic digital assistant, a back-end audio and/or video processing device, and/or a remote cloud-based storage device consistent with the remainder of this disclosure.

The IP network 160 may comprise one or more routers, switches, LANs, WLANs, WANs, access points, or other network infrastructure, including but not limited to, the public Internet. The cloud computing cluster 162 may be comprised of a plurality of computing devices, such as the one set forth in FIG. 3, one or more of which may be executing none, all, or a portion of an electronic digital assistant service, sequentially or in parallel, across the one or more computing devices. The one or more computing devices comprising the cloud computing cluster 162 may be geographically co-located or may be separated by inches, meters, or miles, and inter-connected via electronic and/or optical interconnects. Although not shown in FIG. 1, one or more proxy servers or load balancing servers may control which one or more computing devices perform any part or all of the electronic digital assistant service.

As shown in FIG. 1, database(s) 164 may be accessible via the IP network 160 and/or the cloud computing cluster 162. As shown in FIG. 1, the databases 164 are communicatively coupled with the infrastructure RAN 152 to allow the communication devices (for example, the portable radio 104, the RSM video capture device 106, the laptop 114, and the mobile communication device 133) to communicate with and retrieve data from the databases 164 via infrastructure controller 156 and IP network 160. In some embodiments, the databases 164 are commercial cloud-based storage devices. In some embodiments, the databases 164 are housed on suitable on-premises database servers. The database(s) may include databases such as a long-term video storage database, a historical or forecasted weather database, an offender database perhaps including facial recognition images to match against, a cartographic database of streets and elevations, a traffic database of historical or current traffic conditions, incident database including data such as incident assignment and timeline of incidents, or other types of databases. Databases 164 may further include all or a portion of the databases described herein as being provided at the infrastructure controller 156. In some embodiments, the databases 164 may be maintained by third parties (for example, the National Weather Service or a Department of Transportation, respectively). The databases 164 of FIG. 1 are merely examples. In some embodiments, the system 100 additionally or alternatively includes other databases that store different information. In some embodiments, the databases 164 and/or additional or other databases are integrated with, or internal to, the infrastructure controller 156.

Finally, although FIG. 1 describes a communication system 100 generally as a public safety communication system that includes a user 102 generally described as a police officer and a vehicle 132 generally described as a police cruiser, in other embodiments, the communication system 100 may additionally or alternatively be a retail communication system including a user 102 that may be an employee of a retailer and a vehicle 132 that may be a vehicle for use by the user 102 in furtherance of the employee's retail duties (for example, a shuttle or self-balancing scooter). In other embodiments, the communication system 100 may additionally or alternatively be a warehouse communication system including a user 102 that may be an employee of a warehouse and a vehicle 132 that may be a vehicle for use by the user 102 in furtherance of the employee's retail duties (for example, a forklift). In still further embodiments, the communication system 100 may additionally or alternatively be a private security communication system including a user 102 that may be an employee of a private security company and a vehicle 132 that may be a vehicle for use by the user 102 in furtherance of the private security employee's duties (for example, a private security vehicle or motorcycle). In even further embodiments, the communication system 100 may additionally or alternatively be a medical communication system including a user 102 that may be a doctor or nurse of a hospital and a vehicle 132 that may be a vehicle for use by the user 102 in furtherance of the doctor or nurse's duties (for example, a medical gurney or ambulance). In still another example embodiment, the communication system 100 may additionally or alternatively be a heavy machinery communication system including a user 102 that may be a miner, driller, or extractor at a mine, oil field, or precious metal or gem field and a vehicle 132 that may be a vehicle for use by the user 102 in furtherance of the miner, driller, or extractor's duties (for example, an excavator, bulldozer, crane, front loader). Other possibilities exist as well.

b. Device Structure

Figure 3:
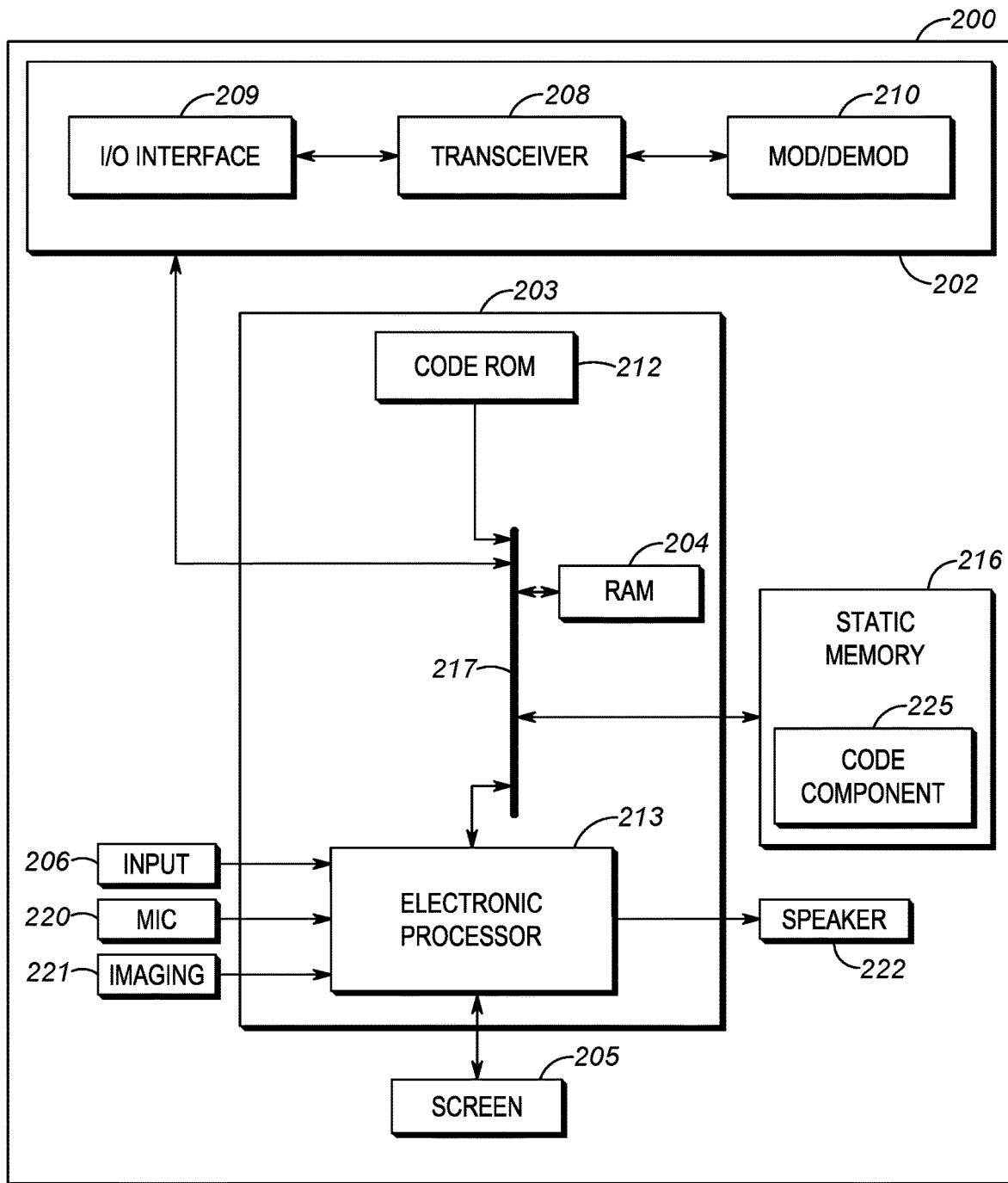
FIG. 3 is a device diagram showing a device structure of a communication device for use in the systems of FIGS. 1 and/or 2 in accordance with some embodiments.

FIG. 3 sets forth a schematic diagram that illustrates a communication device 200 according to some embodiments of the present disclosure. The communication device 200 may be, for example, embodied in the portable radio 104, the RSM video capture device 106, the laptop 114, the mobile communication device 133, the infrastructure controller 156, the dispatch console 158, one or more computing devices in the cloud computing cluster 162, or some other communication device not illustrated in FIG. 1, and/or may be a distributed communication device across two or more of the foregoing (or multiple of a same type of one of the foregoing) and linked via a wired and/or wireless communication link(s). In some embodiments, the communication device 200 (for example, the portable radio 104) may be communicatively coupled to other devices such as the sensor-enabled holster 118 as described above. In such embodiments, the combination of the portable radio 104 and the sensor-enabled holster 118 may be considered a single communication device 200.

While FIG. 3 may represent the communication devices 200A-200C described above with respect to FIGS. 1 and 2, depending on the type of the communication device, the communication device 200 may include fewer or additional components in configurations different from that illustrated in FIG. 3. For example, in some embodiments, the communication device 200 acting as the infrastructure controller 156 of FIG. 1 may not include one or more of the screen 205, microphone 220, imaging device 221, and speaker 222. As another example, in some embodiments, the communication device 200 acting as the portable radio 104 of the RSM video capture device 106 of FIG. 1 may further include a location determination device (for example, a global positioning system (GPS) receiver) as explained above. Other combinations are possible as well.

As shown in FIG. 3, the communication device 200 includes a communications unit 202 coupled to a common data and address bus 217 of a processing unit 203. The communication device 200 may also include one or more input devices (for example, keypad, pointing device, touch-sensitive surface, button, a microphone 220, an imaging device 221, and/or another input device 206) and an electronic display screen 205 (which, in some embodiments, may be a touch screen and thus also acts as an input device), each coupled to be in communication with the processing unit 203.

The microphone 220 may be present for capturing audio from a user and/or other environmental or background audio that is further processed by processing unit 203 in accordance with the remainder of this disclosure and/or is transmitted as voice or audio stream data, or as acoustical environment indications, by communications unit 202 to other portable radios and/or other communication devices. The imaging device 221 may provide video (still or moving images) of an area in a field of view of the communication device 200 for further processing by the processing unit 203 and/or for further transmission by the communications unit 202. A speaker 222 may be present for reproducing audio that is decoded from voice or audio streams of calls received via the communications unit 202 from other portable radios, from digital audio stored at the communication device 200, from other ad-hoc or direct mode devices, and/or from an infrastructure RAN device, or may playback alert tones or other types of pre-recorded audio.

The processing unit 203 may include a code Read Only Memory (ROM) 212 coupled to the common data and address bus 217 for storing data for initializing system components. The processing unit 203 may further include an electronic processor 213 (for example, a microprocessor or another electronic device) coupled, by the common data and address bus 217, to a Random Access Memory (RAM) 204 and a static memory 216.

The communications unit 202 may include one or more wired and/or wireless input/output (I/O) interfaces 209 that are configurable to communicate with other communication devices, such as the portable radio 104, the laptop 114, the wireless RAN 152, and/or the mobile communication device 133.

For example, the communications unit 202 may include one or more wireless transceivers 208, such as a DMR transceiver, a P25 transceiver, a Bluetooth transceiver, a Wi-Fi transceiver perhaps operating in accordance with an IEEE 802.11 standard (for example, 802.11a, 802.11b, 802.11g), an LTE transceiver, a WiMAX transceiver perhaps operating in accordance with an IEEE 802.16 standard, and/or another similar type of wireless transceiver configurable to communicate via a wireless radio network.

The communications unit 202 may additionally or alternatively include one or more wireline transceivers 208, such as an Ethernet transceiver, a USB transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The electronic processor 213 has ports for coupling to the display screen 205, the microphone 220, the imaging device 221, the other input device 206, and/or the speaker 222. Static memory 216 may store operating code 225 for the electronic processor 213 that, when executed, performs one or more of the steps set forth in FIG. 4 and the accompanying text. The static memory 216 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, and the like.

2. Processes for Responding to Location-Variable Group Electronic

Digital Assistant Inquires

In some embodiments, an individual component and/or a combination of individual components of the system 100 may be referred to as an electronic computing device that implements an electronic digital assistant as mentioned above. For example, the electronic computing device may be a single electronic processor (for example, the electronic processor 213 of the portable radio 104). In other embodiments, the electronic computing device includes multiple electronic processors distributed remotely from each other. For example, the electronic computing device may be implemented on a combination of at least two of the electronic processor 213 of the portable radio 104, the electronic processor 213 of the infrastructure controller 156, and the electronic processor 213 of a back-end device in the cloud computing cluster 162 accessible via the IP network 160.

To use the electronic digital assistant implemented by the electronic computing device, the user 102 may, for example, provide an audio inquiry that is received by the microphone 220 of the communication device 200. In accordance with some embodiments, the audio inquiry received at the microphone is further transmitted as audio communications on a talk group channel for receipt by other users in a talk group. The electronic computing device receives signals representative of the audio inquiry (directly from the microphone 220 or through monitoring audio communications on the talk group channel) and analyzes the signals to determine the intent and/or content of the audio inquiry. For example, the electronic computing device may include a natural language processing (NLP) engine configured to determine the intent and/or content of the audio inquiry. The electronic computing device may also be configured to determine a response to the audio inquiry (for example, by retrieving stored data or by requesting data from a database such as the databases 164) and provide the response to an output device of the communication device 200 (for example, one or more of the speaker 222 via a generated audio response and the screen 205 via a generated text, graphic, and/or video-based response). In other words, one or more of the communication device 200, embodied in one or more of the communication devices of FIG. 1, such as the portable radio 104, the infrastructure controller 156, and/or cloud computing cluster 162 may include a natural language processing engine to analyze audio inquiries received from the communication device 200 and provide responses to the audio inquiries in the form of audio data, image data, and/or text data.

Although an audio inquiry is described above, in some embodiments, the electronic computing device receives and responds to other types of queries and inputs. For example, the user 102 may submit a text inquiry to the electronic computing device by typing the text inquiry into a hard keyboard input device or a soft keyboard input provided on the screen 205 of the communication device 200. As another example, the user 102 may use the imaging device 221 to capture an image or video of an area and press a hard or soft key to send the image or video to the electronic computing device to, for example, allow the electronic computing device to identify an object in the image or video.

In accordance with some embodiments, the electronic digital assistant is also added to a talk group (for example, talk group 250) as a talk group member to monitor communications (as well as transmit communications) between communication devices 200A-200C that are members of the communications group. When the electronic computing device implementing the electronic digital assistant detects an audio inquiry, for example, a voice inquiry transmitted on a talk group channel by a particular talk group member, the electronic computing device implementing the electronic digital assistant processes the audio inquiry and responds to the audio inquiry in accordance with a process 400 illustrated in FIG. 4. The inquiry may be a specific inquiry transmitted on the talk group channel with the intent that the electronic digital assistant would hear the inquiry and respond (e.g., a spoken instruction to the electronic digital assistant to perform a particular function or retrieve particular information), or may be an inquiry or statement made from a first user to one or more other users where the electronic digital assistant determines it can extract a useful inquiry from the first user's inquiry or statement and proactively provide additional information, context, or background to the communication group and/or individual or sub-group of users in the communication group in accordance with this disclosure.

Figure 4:
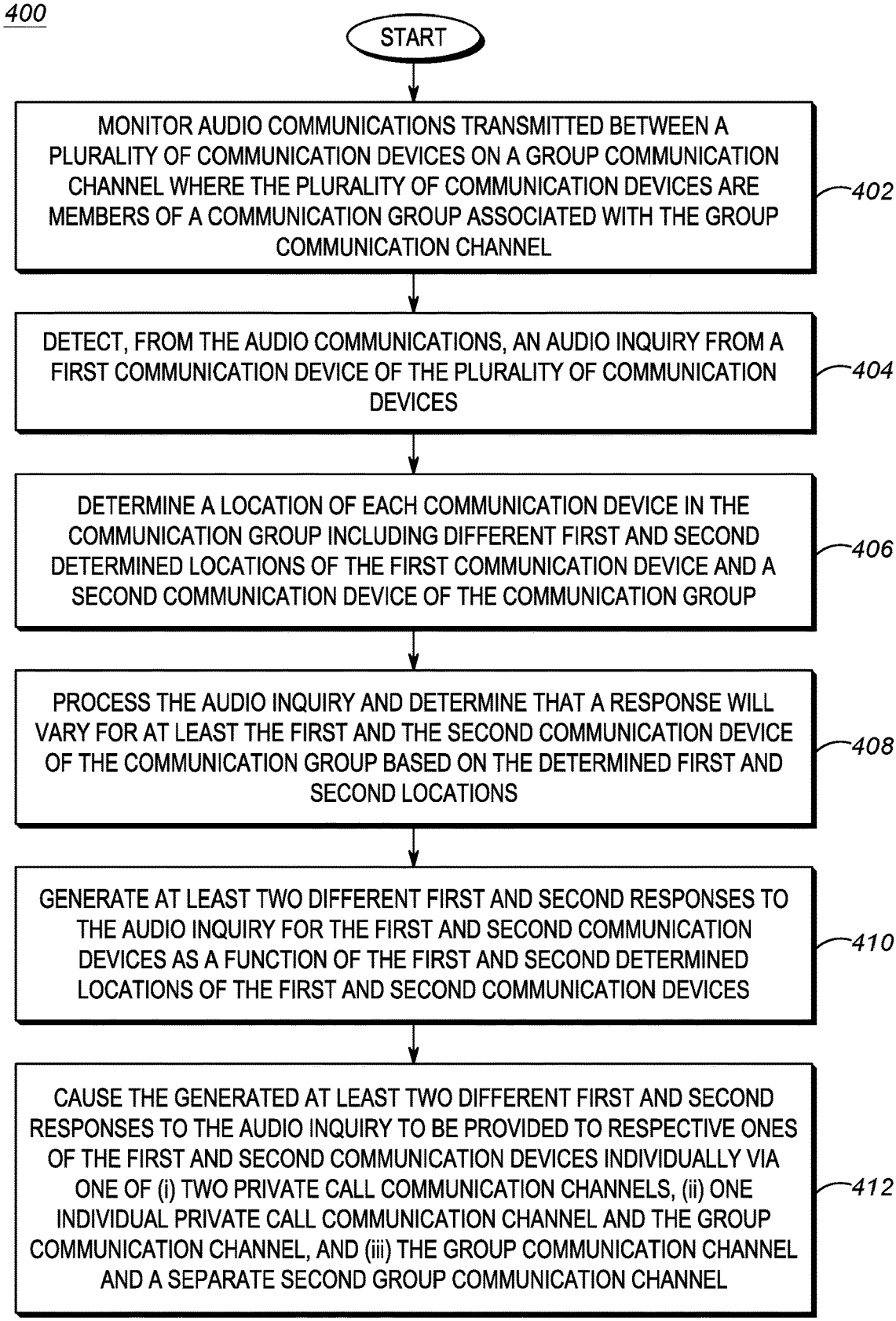
FIG. 4 illustrates a flow chart of a method for responding to location-variable group electronic digital assistant requests in accordance with some embodiments.

FIG. 4 illustrates a flow chart diagram of the process 400 performed by the electronic computing device for responding to location-variable group electronic digital assistant inquires. While a particular order of processing steps, message receptions, and/or message transmissions is indicated in FIG. 4 as an example, timing and ordering of such steps, receptions, and transmissions may vary where appropriate without negating the purpose and advantages of the examples set forth in detail throughout the remainder of this disclosure.

At step 402, the electronic computing device monitors audio communications transmitted between a plurality of communication devices on a group communication channel (such as between group member communication devices 200A-200C of FIG. 2), where the plurality of communication devices are members of a communication group associated with the group communication channel. As set forth earlier, the group communication channel may be a conventional or trunked LMR channel, or may be an LTE channel over which an OMA-POC session is established, among other possibilities. The audio communications monitored may be bi-directional group communications between two or more members of the group, and/or may be unidirectional transmissions from a single member of the group to one or more other members of the group. Other possibilities exist as well.

The electronic computing device may monitor the audio communications over the group communication channel in a number of different ways. In accordance with some embodiments, the electronic computing device implementing the electronic digital assistant may be added to the communication group as another group member that monitors all audio communications transmitted between members of the communication group on the group communication channel. Additionally or alternatively, a PTT server that controls the group communications may forward the audio communications transmitted on the group call to the electronic computing device to allow the electronic computing device to monitor the audio communications in the communication group. In another embodiment, the electronic computing device (implementing the electronic digital assistant) may be locally implemented at each communication device 200 to monitor the audio communications received at a microphone 220 of the communication device 200, for example, prior to the voice inquiry being processed and transmitted as audio communications on the group communication channel associated with the communication device 200, and/or to monitor the audio communications received at a wireless transceiver 208 of the communication device 200 as audio communications on the group communication channel associated with the communication device 200, for example, prior to the audio communications being played back at a speaker 222 of the communication device 200.

Also at step 402, the electronic computing device may monitor private call channels (e.g., 1:1 calls) between two communication devices one or more of which are also members of the communication group, such that content from the monitored private calls may be used to obtain and store additional context information that may be accessed in responding to a subsequent audio inquery detected on the group communication channel. Private call channels may established via a conventional or trunked LMR channel assigned or reserved for private calls, or over an LTE channel established for the private call. The electronic computing device may monitor the audio communications over the private call channels in a number of same or similar ways as set forth above with respect to the group communication channel.

In any event, audio communications monitored over the group communication channel and/or over one or more private call communication channels may be stored (e.g., in digital audio form, or perhaps voice-to-text converted and stored in text form) for use in answering future audio inquiries.

At step 404, the electronic computing device detects, from the audio communications monitored at step 402, an audio inquiry from a first communication device (e.g. communication device 200A of FIG. 2) of the plurality of communication devices in the communication group. As used herein, the term "audio inquiry" indicates an inquiry from a user (whether explicit or implicit) requiring or allowing for a supplementary or responsive electronically generated response from the electronic digital assistant.

In some embodiments, the audio inquiry may be preceded by a nonce word such as "hey VP," "hey Virtual Partner", or some other mechanism that may be similar in practice to known nonce terms such as "hey Siri'" or "hey Google". The nonce term may be used by the electronic computing device to more easily discern what parts of the audio communications monitored at step 402 should be acted upon and used to generate responses at subsequent steps. In other embodiments, no nonce term may be used and/or detected, and instead, the electronic computing device may monitor all audio communications for explicit and/or implicit opportunities to provide additional, responsive, or supportive information to speech content identified in the monitored audio communications using a natural language parser and/or a keyword detector or keyword parsing engine.

The audio inquiry detected at step 404 may be, for example, a request for directions (e.g., vehicular, foot, public transport, or bike directions) to a particular destination such as an active incident destination, a specified address destination, a suspect's home location destination, or some other geographic location destination. As one example, the audio inquiry detected at step 404 may refer to a single destination such as "What are the directions to the fire incident off of South Street?," which may refer to an incident occurring at location 262 near civilian 260 as illustrated in FIG. 2. As another example, the audio inquiry detected at step 404 may refer to multiple potential destinations such as "What are the directions to the nearest incident border establishment or checkpoint?"

Additionally or alternatively, the audio inquiry may be an indoor location within a building, such as a particular room, hallway, conference hall, or other indoor location. As one example, the audio inquiry detected at step 404 may be "How do I get to the conference room with the Public Safety Responders Conference?" As another example, the audio inquiry detected at step 404 may refer to multiple potential indoor destinations such as "What is the quickest evacuation route out of this building?"

Still further, the audio inquiry may be a request for task assignment(s), such as what beat to patrol, what role to take at a particular incident (perhaps also based on a determined type of the incident), or some other task assignment-related inquiry. As one example, the audio inquiry detected at step 404 may be "What are the task assignments for the $43^{rd}$ Precinct today?"

Even further, the audio inquiry may be a request for equipment assignment(s), such as what equipment should be loaded into a vehicle, what equipment should be brought to a particular incident (perhaps also based on a determined type of the incident), or some other type of equipment assignment related inquiry. As one example, the audio inquiry detected at step 404 may be "What equipment should the $43^{rd}$ Precinct bring to the fire activity incident off of South Street?" Other types of audio inquiries could be detected as well.

The electronic computing device may also use additional information such as information obtained from data received from sensor devices and/or other type of information such as the inquiring user's (and/or other communication group member's) current incident assignment, role, other communication groups, channel scan lists, historical queries/actions, and the like to determine whether the audio communication relates to an audio inquiry from a user of the communication device.

At step 406, the electronic computing device determines a location of each communication device in the communication group, such as a location of each of communications devices 200A-200C in the talk group 250 of FIG. 2. The location of each communication device in the communication group may be provided to the electronic computing device by each respective communication device. For example, each communication device in the communication group may independently determine its location, such as its own longitude/latitude coordinates determined via a GNSS system such as the GPS, or its own Cartesian or polar coordinates determined via a triangulation process via known locations of base stations or other wireless transmitters. Additionally or alternatively, locations for each communication device in the communication group may be determined by the wireless communication network and provided to the electronic computing device, such as via a network-initiated triangulation process on wireless signals transmitted by a respective communication device and received at a plurality of known base station or other wireless access point locations. The determined location of each communication device in the communication group may be electronically stored at the electronic computing device accompanying an identifier uniquely identifying the respective communication device in the group.

Next, at step 408, the electronic computing device processes the audio inquiry and determines that a response to the inquiry will vary for at least the first and a second communication device of the communication group based on the determined location of each of the first and second communication devices in the group.

In accordance with some embodiments, the electronic computing device analyzes the audio inquiry using the NLP engine to obtain the intent and content of audio inquiry (and/or using the keyword parsing method or any other method mentioned above) and determines that a type of the inquiry is one that will vary based on a location of the requesting first communication device. For example, a location-variable inquiry mapping may be stored at the electronic communication device that indicates, for any particular audio inquiry type, whether that type of audio inquiry is known to vary based on a location of the group members. An example location-variable inquiry type mapping is set forth in Table I below.

TABLE I

Example Location-Variable Inquiry Type Mapping

| Type of Audio Inquiry | Does Response Vary Based on Location of Group Members? |
|---|---|
| Geographic Directions | Yes |
| Suspect Description | No |
| Task Assignment | Yes |
| On-duty Roll Call | No |

As set forth in Table I, some types of audio inquiries from one of the group members may be associated with a response that varies based on locations of the group members, while other types of audio inquiries may be associated with a response that does not vary based on locations of the group members. At step 408, the electronic computing device may determine that the response will vary for at least the first (requesting) and a second communication device of the communication group by determining that the type of audio inquiry that was detected at step 404 is one whose response will vary based on location, and then determining, based on the location information determined at step 406, that at least the first and the second communication devices actually are located at different locations (e.g., not all group members are at a same current location). If, on the other hand, the electronic computing device determines that the type of audio inquiry detected at step 404 is one whose response does not vary based on a location of the group members, or that the group members are all located at a same location, a same single response may be provided to the group members on the group communication channel alone outside of process 400 but in a manner similar to step 412 of process 400.

With respect to the example set forth in FIG. 2, the electronic computing device may determine that a request for directions, received on a group communication channel of the talk group 250 from communication device 200A, to the fire incident at location 262 is of a type where the response will vary by group member location and that communication devices 200A, 200B, 200C are actually located at various different locations 210A, 210B, 210C.

Next, at step 410, the electronic computing device generates at least two different first and second responses to the audio inquiry for the first and second communication devices that varies as a function of the determined locations of each of the first and second communication devices. The generated response may be in the form of a text-based response generated with the aid of one or more databases such as databases 164 accessed by the electronic computing device as a function of the content of the audio inquiry, or may be a multimedia response (e.g., including audio and/or video) provided to the first and second communication devices via a combination of two or more group (e.g., broadcast or multicast) and/or private (e.g., unicast) communication channels.

For example, where the audio inquiry was a request for directions to a particular destination such as "What are the directions to the fire incident off of South Street?", the electronic computing device may access a cartographic database at databases 164 using current location information of each of the first and second communication devices from step 406 and generate different first and second responses that set forth respective directions for each of the first and second communication devices to proceed to the location of the fire incident in the audio inquiry from their different relative current locations. The response in this case may be turn-by-turn directions in text or audio format, or may be a script that is executed as the first and second communication device moves through the directions (according to their detected movements) and that proceeds through the list of directions as needed. In still other embodiments, the response may be a graphical cartographic image with a highlighted respective route for each of the users of the first and second communication devices to take to proceed to the fire incident. In other embodiments where there may be multiple destination locations, the electronic computing device may compare each communication devices' current location to a closest one of determined multiple destination locations (e.g., incident checkpoints for example), and generate different responses with directions to the closest of the multiple destination locations in a same or similar manner to that set forth above. Other possibilities exist as well.

With respect to the example set forth in FIG. 2, the electronic computing device may generate three separate sets of directions for each of communication devices 200A, 200B, 200C located at different locations 210A, 210B, 210C to get to the location of the fire incident at location 262. The first set may direct communication device 200A located at location 210A east along North Ave. 252 to ABC Ave. 258, south along XYZ Ave. 256 to South St. 254, and finally east along South St. 254 to arrive at the fire incident at location 262. The second set may direct communication device 200B located at location 210B east along South St. 254 to arrive at the fire incident at location 262. The third set may direct communication device 200C located at location 210C south along ABC Ave. 258 to South St. 254, and east along South St. 254 to arrive at the fire incident at location 262.

In the alternative example where the audio inquiry was an indoor location request within a building, such as "How do I get to the conference room with the Public Safety Responders Conference?", the electronic computing device may access a floor plan database at databases 164 using current indoor location information of each of the first and second communication devices from step 406 and generate different first and second responses that set forth respective directions for each of the first and second communication devices to proceed to the conference room hosting the requested conference from their different relative current indoor locations. Similar to the fire incident example, the response in this case may be turn-by-turn directions in text or audio format, may be a script, or may be a graphical floor-plan image with a highlighted respective route. In other embodiments where there may be multiple indoor destination locations, the electronic computing device may compare each communication devices' current indoor location to a closest one of determined multiple indoor destination locations (e.g., building evacuation points for example), and generate different responses (e.g., different directions) in a same or similar manner to that set forth above. Other possibilities exist as well.

In the further example where the audio inquiry was a request for task assignment(s), such as "What are the task assignments for the 43$^{rd}$ Precinct today?", the electronic computing device may access a pending task assignment database at databases 164 using current location information of each of the first and second communication devices from step 406 and generate different first and second responses that set forth respective pending tasks nearest each of the first and second communication devices to proceed to and begin executing. For example, the first communication device may be currently located closest to a central location of an incident and may be assigned a task of identifying suspects or preserving evidence, while the second communication device may be currently located farther from the central location and may be assigned a task of securing a border around the incident or establishing a check-point for people or vehicles moving away from the central location of the incident, among other possibilities. Similar to the fire incident example, the response in this case may be provided in a text or audio format, may be a timeline entry that causes a task to be inserted in a task timeline in the first and/or second communication device's timelines, or may be some form of graphical depiction of the task to be performed (perhaps including the location as well). Other possibilities exist as well.

In a still further example where the audio inquiry was a request for equipment assignment(s), such as "What equipment should the 43$^{rd}$ Precinct bring to the fire activity incident off of South Street?", the electronic computing device may access an incident to equipment mapping locally or at databases 164 to retrieve equipment required for the type of activity occurring at the destination location (a fire in this example), and then access an equipment location database at databases 164 using current location information of each of the first and second communication devices from step 406 and generate different first and second responses that set forth equipment each of the first and second communication devices is near and should obtain prior to proceeding to the fire incident destination location. For example, the first communication device may be currently located closest to a jaws of life piece of equipment needed at the incident scene and may be assigned the task of obtaining that equipment and bringing it to the incident, while the second communication device may be currently located closer to a set of oxygen breathing tanks and may be assigned the task of securing the oxygen breathing tanks and bringing them to the incident, among other possibilities. Similar to the first fire incident example above, the response in this case may be provided in a text or audio format, may be a timeline entry that causes an equipment-related task or instruction to be inserted in a task or incident timeline in the first and second communication device's timelines prior to a task to arrive at the incident, or may be some form of graphical depiction of the equipment to be obtained (perhaps including the location as well).

Of course, the electronic computing device may also use additional information such as information obtained from data received from sensor devices and/or other type of information such as the inquiring user's (and/or other communication group member's) current incident assignment, role, other communication groups, channel scan lists, historical queries/actions, and the like in generating the at least two different first and second responses to the audio inquiry. Other possibilities exist as well.

Next, at step 412, the electronic computing device causes the generated at least two different first and second responses to the audio inquiry to be provided to respective ones of the first and second communication devices individually via two private call communication channels, via one private call communication channel and the group communication channel, or via the group communication channel and a separate second group communication channel.

For example, providing the generated at least two different first and second responses to the audio inquiry to the first and second communication devices may include providing the generated at least two different first and second responses to the audio inquiry to the first and second communication devices via two private call communication channels. These two private call communication channels may be established using any one of the protocols set forth above, and in some embodiments, may be already established with each communication device, may be reserved for such use and assigned upon request by the electronic computing device, or may be established and assigned only after request by the electronic computing device. If not already established, the electronic computing device causes a request to be transmitted to establish each of the first and second private call channels to a network system call controller, PTT server, zone controller, MME, BSC, MSC, site controller, Push-to-Talk controller, or other network call controlling device, which may be fully or partially implemented at infrastructure controller 156 or in cloud computing cluster 162 of FIG. 1, among other possibilities. The calls may then be established simultaneously or sequentially between the electronic computing device and the respective communication devices, via which the electronic computing device may directly provide the two different first and second responses to the first and second communication devices, or the call may be established simultaneously or sequentially between the network call controlling device and the first and second communication devices, via which the electronic computing device may indirectly provide the two different first and second responses to the first and second communication devices by the electronic device providing the first and second responses to the network call controlling device and requesting the network call controlling device to provide them to the respective first and second communication devices.

The text-based (e.g., e-mail, text message, instant message, etc.) or multimedia-based (e.g., audio, video, audio/video, image, etc.) first and second response may then be provided to the respective first and second communications devices over the established first and second private call communication channels. In some embodiments, where no response will be provided on the group communication channel, an indication such as a tone or alert may be provided over the group communication channel so that remaining devices on the group communication channel that have not been assigned a private communication channel to receive a response may determine that responses to the audio inquiry are being provided privately and will not be provided over the group communication channel over which the audio inquiry was originally provided. In still other embodiments where responses are provided to the first and second communication devices over private communication channels, and where remaining communications devices in the group are located at a substantially same or similar location (e.g., within 500 feet, 1 mile, or 5 miles of each other), process 400 may include generating a different third response to the audio inquiry for remaining one or more communication devices in the communication group, other than the first and second communication devices, as a function of a determined substantially similar location of each of the remaining one or more communication devices in the communication group; and providing the generated third response to the audio inquiry to the remaining one or more communication devices in the communication group via the group communication channel.

With respect to the example set forth in FIG. 2, the electronic computing device may provide the three separate sets of directions for each of communication devices 200A, 200B, 200C via three separate private communication channels established by the electronic computing device.

As another example, providing the generated at least two different first and second responses to the audio inquiry to the first and second communication devices may include providing the generated at least two different first and second responses to the audio inquiry to the first and second communication devices via one individual private call communication channel and the (already established) group communication channel. The one individual private call communication channel may be established in any one of the ways as already set forth above using any one of the protocols set forth above. The text-based (e.g., e-mail, text message, instant message, etc.) or multimedia-based (e.g., audio, video, audio/video, image, etc.) first and second response may then be provided to the respective first and second communications devices over the established private call communication channel and group communication channel.

In a still further example, providing the generated at least two different first and second responses to the audio inquiry to the first and second communication devices may include providing the generated at least two different first and second responses to the audio inquiry to the first and second communication devices via the group communication channel and a second separate established group communication channel. The second separate established group communication channel may be established in a manner similar to the individual private call communication channel already set forth above using any one of the protocols set forth above supporting group communications and the second group communication channel may be established responsive to a corresponding request transmitted by the electronic computing device to a network call controlling device. In this example, the first group communication channel may include the first communication device and additional other communication devices of the communication group, and the second group communication channel may include the second communication device and further other communication devices of the communication group (different from the additional other communication devices of the communication group). The text-based (e.g., e-mail, text message, instant message, etc.) or multimedia-based (e.g., audio, video, audio/video, image, etc.) first and second response may then be provided to the respective first and second communications devices over the established group communication channels.

CONCLUSION

In accordance with embodiments of the disclosure, system and methods described herein can be advantageously employed in public safety environments to more intelligently and effectively respond to location-variable group electronic digital assistant inquiries. Additional private and group communication channels may be established as necessary based on an electronically determined variability of the electronic digital assistant's responses relative to group member location variability, improving the usefulness and intelligibility of the generated responses, and allowing for first responders, retailers, and other users to spend more time with their eyes up and attention focused on clients, customers, and civilians instead of with their eyes down individually and manually searching electronic databases. Other benefits and advantages are possible as well.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions.

The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for responding to location-variable group electronic digital assistant requests, the method comprising:
    monitoring, at an electronic computing device, audio communications transmitted between a plurality of communication devices on a group communication channel, wherein the plurality of communication devices are members of a communication group associated with the group communication channel;
    detecting, at the electronic computing device, from the audio communications, an audio inquiry from a first communication device of the plurality of communication devices; determining, by the electronic computing device, a location of each communication device in the communication group including first and second determined locations of the first communication device and a second communication device of the communication group, the first and second determined locations being different from one another;
    processing, at the electronic computing device, the audio inquiry and determining, by the electronic computing device, that a response will vary for at least the first and the second communication device of the communication group based on the first and second determined locations, wherein processing the audio inquiry comprises extracting one or more keywords from the audio inquiry and determining, based on the extracted one or more keywords, that the audio inquiry corresponds to a request for directions to a particular geographic destination location;
    generating, by the electronic computing device, at least two different first and second responses to the audio inquiry for the first and second communication devices as a function of first and second determined locations of the first and second communication devices of the communication group; and
    causing, by the electronic computing device, the generated at least two different first and second responses to the audio inquiry to be provided to respective ones of the first and second communication devices individually via one of (i) two private call communication channels, (ii) one individual private call communication channel and the group communication channel, and (iii) the group communication channel and a separate second group communication channel, wherein the two different first and second responses provided to the first and second communication devices set forth different geographic routes, as a function of the first and second determined locations, for each of the respective first and second communication devices to travel to the particular geographic destination location.

2. The method of claim 1, wherein providing the generated at least two different first and second responses to the audio inquiry to the first and second communication devices comprises providing the generated at least two different first and second responses to the audio inquiry to the first and second communication devices via two private call communication channels.

3. The method of claim 2, wherein no generated response to the audio inquiry is provided on the group communication channel.

4. The method of claim 3, wherein a pre-stored audio indicator is played back via the group communication channel, the pre-stored audio indicator indicating that all responses to the audio inquiry are being provided individually and none over the group communication channel.

5. The method of claim 2, further comprising:
generating a different third response to the audio inquiry for remaining one or more communication devices in the communication group, other than the first and second communication devices, as a function of a determined substantially similar location of each of the remaining one or more communication devices in the communication group; and
providing the generated third response to the audio inquiry to the remaining one or more communication devices in the communication group via the group communication channel.

6. The method of claim 1, wherein providing the generated at least two different first and second responses to the audio inquiry to the first and second communication devices comprises providing the generated at least two different first and second responses to the audio inquiry to the first and second communication devices via one individual private call communication channel and the group communication channel.

7. The method of claim 1, wherein generating the different first and second responses to the audio inquiry comprises:
generating the different first and second responses to the audio inquiry based on one or both of content extracted from the monitored audio communications and content accessed from one or more local or remote databases.

8. The method of claim 1, wherein processing the audio inquiry comprises:
extracting one or more keywords from the audio inquiry; and
determining, based on the extracted one or more keywords, that the audio inquiry corresponds to a particular indoor building location, and the two different first and second responses provided to the first and second communication devices set forth different indoor routes for each of the respective first and second communication devices to travel to the particular indoor building location.

9. The method of claim 1, wherein processing the audio inquiry comprises:
extracting one or more keywords from the audio inquiry; and
determining, based on the extracted one or more keywords, that the audio inquiry corresponds to a request for task assignments.

10. The method of claim 9, wherein the two different first and second responses provided to the first and second communication devices set forth different task assignments for each of the respective first and second communication devices.

11. The method of claim 10, wherein the one of the first and second communication devices nearest an incident is assigned a task of identifying suspects, one the other one of the first and second communication devices is assigned a task of securing a border around the incident.

12. The method of claim 1, wherein processing the audio inquiry comprises:
extracting one or more keywords from the audio inquiry; and
determining, based on the extracted one or more keywords, that the audio inquiry corresponds to a request for equipment assignments.

13. The method of claim 12, wherein the one of the first and second communication devices nearest a source for a first piece of equipment needed at an incident is assigned a task of retrieving the first piece of equipment, one the other one of the first and second communication devices is assigned a task of securing a second piece of equipment different from the first.

14. The method of claim 1, wherein monitoring comprises:
establishing, via the electronic computing device, a communication with a talk group server controlling the audio communications between the plurality of communication devices on the group communication channel; and
accessing the audio communications via the talk group server.

15. The method of claim 1, wherein the electronic computing device is embedded in an infrastructure computing device, and communicates with the plurality of communication devices via a wireless infrastructure network.

16. The method of claim 1, wherein the electronic computing device is an ad-hoc computing device, and communications with the plurality of communication devices via an ad-hoc wireless network.

17. The method of claim 1, wherein determining the location of each communication device in the communication group comprises receiving global positioning system (GPS) coordinates from each of the communication devices and associating the received GPS coordinates with the respective communication device that transmitted them.

18. An electronic computing device for responding to location-variable group electronic digital assistant requests, the electronic device comprising:
an electronic processor; and
a communication interface communicatively coupled to the electronic processor, wherein the electronic processor is configured to:
monitor audio communications transmitted between a plurality of communication devices on a group communication channel, wherein the plurality of communication devices are members of a communication group associated with the group communication channel;
detect, from the audio communications, an audio inquiry from a first communication device of the plurality of communication devices;
determine a location of each communication device in the communication group including first and second determined locations of the first communication device and a second communication device of the communication group, the first and second determined locations being different from one another;
process the audio inquiry and determine that a response will vary for at least the first and the second communication device of the communication group based on the first and second determined locations, wherein processing the audio inquiry comprises extracting one or more keywords from the audio inquiry and determining, based on the extracted one or more keywords, that the audio inquiry corresponds to a request for directions to a particular geographic destination location;
generate at least two different first and second responses to the audio inquiry for the first and second communication devices as a function of first and second determined locations of the first and second communication devices of the communication group; and cause the generated at least two different first and second responses to the audio inquiry to be provided to respective ones of the first and second communication devices individually via one of (i) two private call communication channels, (ii) one individual private call communication channel and the group communication channel, and (iii) the group communication channel and a separate second group communication channel, wherein the two different first and second responses provided to the first and second communication devices set forth different geographic routes, as a function of the first and second determined locations, for each of the respective first and second communication devices to travel to the particular geographic destination location.

\* \* \* \* \*